United States Patent [19]

Widehn

[11] 4,220,037
[45] Sep. 2, 1980

[54] WEIGHING SCALE CALIBRATING MACHINE

[75] Inventor: Åke Widehn, Vesteras, Sweden

[73] Assignee: ASEA AB, Vesteras, Sweden

[21] Appl. No.: 9,400

[22] Filed: Feb. 1, 1979

[30] Foreign Application Priority Data

Feb. 6, 1978 [SE] Sweden .............................. 7801327

[51] Int. Cl.³ ............................................ G01G 23/00
[52] U.S. Cl. ..................................................... 73/1 B
[58] Field of Search ............. 73/1 B, 161, 788, 432 R; 33/288

[56] References Cited

U.S. PATENT DOCUMENTS 2,532,749  12/1950  Aurand et al. ...................... 73/432 R Primary Examiner—S. Clement Swisher
Attorney, Agent, or Firm—Watson, Cole, Grindle & Watson

[57] ABSTRACT

A loading machine for use in the calibration of strain transducers attached to axles or to arms for balancing the load between two rear axles of a wheeled vehicle having a girder frame and ground engaging wheels. The machine is adapted for use with weighing equipment including at least one box girder having at least two load scales thereon for supporting two of the vehicle wheels. A tensile force applying mechanism engages the vehicle and the box girder for pulling girder frame toward the box girder, the output of the scales when tensile force is applied by such mechanism representing a value of a simulated load on the vehicle.

2 Claims, 2 Drawing Figures

WEIGHING SCALE CALIBRATING MACHINE

FIELD OF THE INVENTION

The present invention relates to a loading machine for application in the calibration of strain transducers attached to the axles or to the arms for balancing the load between two rear axles in wheeled vehicles.

In order to measure vehicle load, axle load or wheel load, it is known to attach strain transducers to the axles or to the arms for balancing the load between two rear axles or to both, in order to sense the deformations, which are generated in these parts due to the dead weight and load of the vehicle. As the stress in a certain point and at a certain load varies between different samples of axles or balancing arms due to dimensional tolerances, it is necessary to calibrate the transducers after they are attached so as to obtain the required measuring accuracy. It is desirable that the calibration can be accomplished with known and easily available equipment and with as little detrimental effect to the vehicle as possible.

PRIOR ART

Up to the present the calibration has been performed in such a way that the load carrier, which in most cases consists of a platform body, has been loaded with a known weight and the transducers have been calibrated to indicate this weight. If several calibration points are desired, the load on the platform body has to be changed. In any event, it is necessary to have a reasonably reliable calibration point in the neighbourhood of the maximum load. In vehicles for a load of some ten tons, this means that considerable amounts of load in the form of sand bags, concrete blocks, etc., of known weights have to be loaded and unloaded for each calibration. This is a most uneconomic and unpractical method.

SUMMARY OF THE INVENTION

According to the invention the axles are fundamentally loaded by vertical tensile forces on the vehicle frame, applied directly over the appropriate axle, giving rise to compressive forces transmitted via spring mountings, springs, axle and wheels to wheel load scales of known type placed on a box girder. At double rear axles it is necessary to introduce the force on the frame to obtain a correct force application on the axles, but at single axles, for example the front axle, it is possible to introduce the tensile force directly on the laminated springs. The axles are loaded by pulling the frame or, when applicable, the laminated springs towards the box girder by means of straps tensioned by winches or hydraulic cylinders. As the wheels transmit the force to wheel load scales the transducers can be calibrated according to the indications of the scales. What otherwise characterizes the invention is evident from the claims. With reference to the accompanying drawings one of many possible embodiments of the invention will be described.

BRIEF DESCRIPTION OF THE FIGURES

In the accompanying drawings.

DETAILED DESCRIPTION

Figure 1:
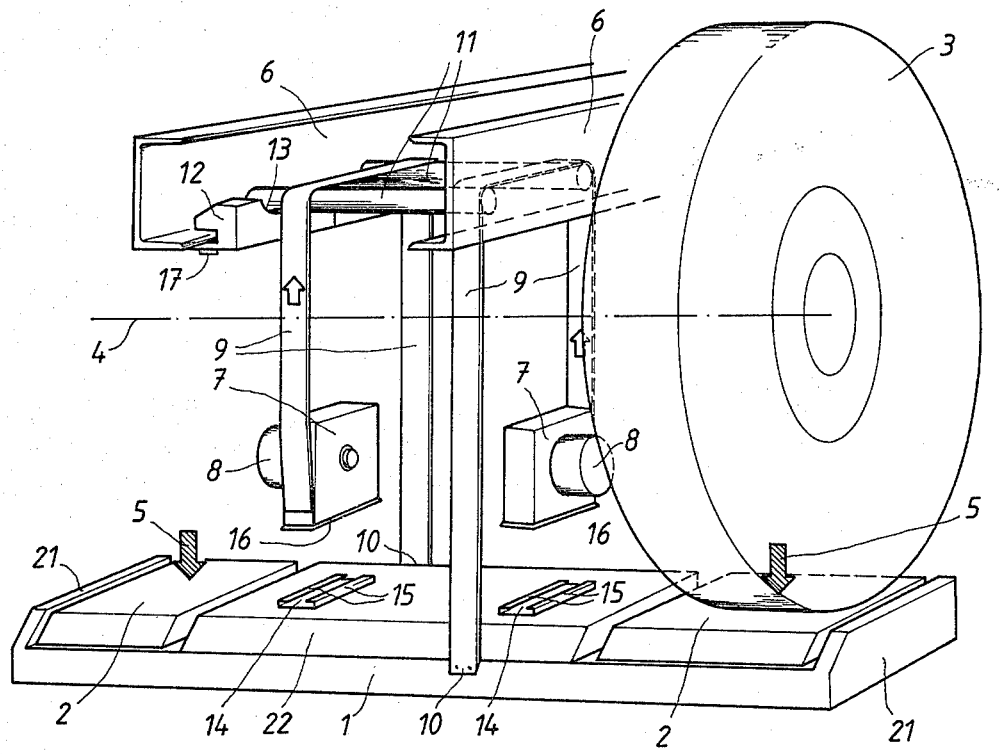
FIG. 1 shows the invention applied to a rear axle.

In the embodiment of the loading machine shown in FIG. 1, a box girder 1 of a known type is used, provided with at least two known wheel load scales 2 arranged on top of the box girder.

Thereby one scale per wheel can be used or one scale may be common to two twin wheels arranged beside each other. In the Figure only one wheel 3 is shown with the axle indicated by a dash dotted line 4. The wheel force against the scales is indicated by arrows 5. The frame of the vehicle, a truck in this case, is shown here as two U-girders 6, with the flanges of the two girders extending towards each other. In order to simulate a load on the vehicle, the frame is pulled towards the box girder upon calibration of the transducers, whereby the wheels will press on the scales 2 with a corresponding force. In the shown example the pull is exerted by means of two motor driven winches 7 of known design and having a driving motor 8. Each of the winches tightens a strap 9, one end of which is fastened to the winch and the other end is fastened to the box girder 1 at a point indicated a 10. In order to attain the best symmetry in the pulling force, the two winches are turned in opposite directions so that one strap is fixed to one side of the box girder and the other is fixed to the other side. As the arrangement shown in FIG. 1 is intended for a rear axle, it must be designed with due regard to the fact that the differential case is situated above the centre of the box girder. The two straps must therefore be spread apart by a certain distance. The strap is passed over two cross bars 11, which have their ends resting on a load distributing beam 12 at each U-girder 6. The cross bars rest in recesses 13 in the load distributing beams, as the straps, when tightened, have a tendency to pull the cross beams towards each other. The recesses 13 must thus be deep enough so that the cross bars cannot be pulled out of their positions at maximum pulling force. The winches 7 are fixed to the upper side of the box girder by known means, for example with bolts or as shown in the Figure with a bar 14 with a dovetail slot 15, accomodating the dovetail shaped winch base 16. In can be useful to arrange two sets of bars 14 at right angles to each other to make it possible to place the winches in different directions. The load distributing beams are preferably provided with a slot, which fits around the lower flange of the U-girder. Furthermore it is suitable to arrange fixing screws 17 to lock the load distributing beam to the flange. If the calibration of the transducers is performed before the platform body is fitted on the frame, the load distributing rods 12 can be placed on top of the U-girders 6.

Figure 2:
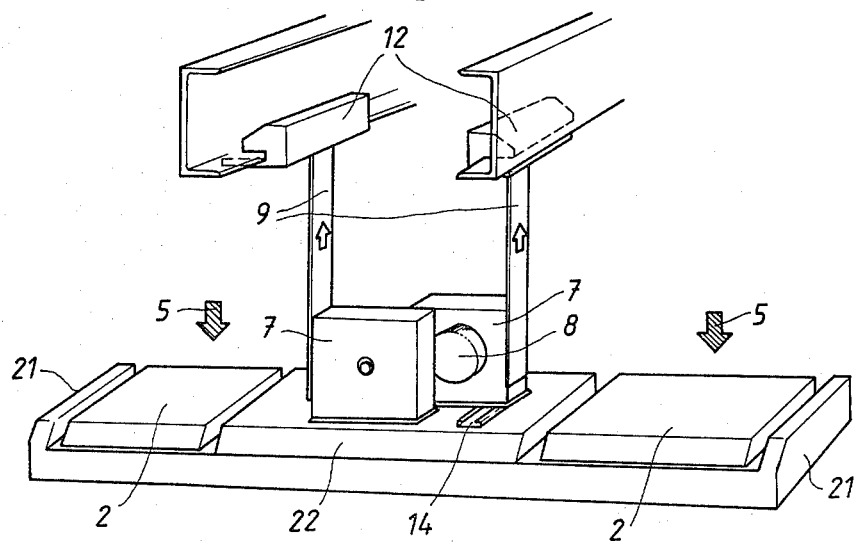
FIG. 2 shows the invention applied to a front axle.

When calibrating the transducers on a front axle, it is normally not possible to use the cross bars, as the engine is situated between the frame girders 6. The load is, however, considerably lower on the front axle, which allows the straps to be fastened direct to the load distributing beams 12 as shown in FIG. 2. As a result of this the winches have to be placed in the above mentioned slots, so as to be disposed 90° from that shown in FIG. 1.

Instead of the winches and straps shown in FIGS. 1 and 2, one can use hydraulic or pneumatic cylinders fitted between the box girder and the vehicle frame.

The two scales 2 are situated in individual compartments on the upper side of the box girder. The compartments are bounded by the end walls 21 of the box girder and the end surfaces of the platform 22 forming the middle part of the box girder where the winches are mounted. The compartments have to be considerably longer than the length of the scale in the direction of the box girder to allow adjustment of the distance between the scales to suit different distances between the wheels. In order to achieve correct loading of the vehicle it is necessary to use a dummy box girder of the same height under the other wheels. Drive-up ramps of known type should be arranged on both sides of the box girders.

When calibrating the transducers on a vehicle with two rear axles which are mechanically coupled so that they share the load in a predetermined way, it is necessary to have box girders with scales under the wheels on both axles and link these box girders together. Without these links it would only be possible to apply a tensile force simulating the dead weight. When applying a greater force, the box girder on which the tensile force is applied would be lifted off the bed, if it were not restrained by the above mentioned links.

I claim:

1. A loading machine for use in the caliberation of strain transducers attached to axles or to arms for balancing the load between two rear axles of a wheeled vehicle having a girder frame and ground engaging wheels, the machine being adapted for use with weighing equipment including at least one box girder having at least two load scales disposed thereon for respectively supporting two of said wheels, the machine comprising tensile force applying means for engagement with the girder frame and the box girder for pulling the girder frame toward the box girder, the output of the scales when tensile force is applied by said means representing a value of a simulated load on the vehicle, whereby the machine establishes a measured accurate and controlled wheel force giving a known defined and simultaneous loading on the axles and/or the balancing arms for creating controlled mechanical stress in the axles and/or the balancing arms and thus simulating a vehicle load giving the same wheel force.

2. The machine according to claim 1, wherein said means is associated with each of the wheels and comprise at least one winch engageable with the box girder, and a strap engaged by said winch for tensioning same, said strap being engageable with the girder frame, whereby the girder frame can be pulled toward the box girder with a force controlled by said winch.

* * * * *